(12) United States Patent
Steen et al.

(10) Patent No.: US 10,267,241 B2
(45) Date of Patent: *Apr. 23, 2019

(54) SYSTEM AND METHOD FOR MANAGING A VOLATILE ORGANIC COMPOUND EMISSION STREAM

(71) Applicant: Leidos, Inc., Reston, VA (US)

(72) Inventors: William Ronald Steen, Eastpointe, MI (US); Scott Francis Coon, Madison, WI (US)

(73) Assignee: Leidos, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/724,664

(22) Filed: Oct. 4, 2017

(65) Prior Publication Data

US 2018/0023488 A1    Jan. 25, 2018

Related U.S. Application Data

(63) Continuation of application No. 15/352,674, filed on Nov. 16, 2016, now Pat. No. 9,784,192, which is a (Continued)

(51) Int. Cl.
| | | |
|---|---|---|
| *F02G 5/00* | (2006.01) | |
| *H02K 7/18* | (2006.01) | |
| *F02B 63/04* | (2006.01) | |
| *F02D 19/02* | (2006.01) | |
| *B01D 53/72* | (2006.01) | |
| *F02D 19/06* | (2006.01) | |

(Continued)

(52) U.S. Cl.
CPC ............ *F02D 19/029* (2013.01); *B01D 53/72* (2013.01); *F02B 63/04* (2013.01); *F02D 19/0642* (2013.01); *F02D 29/06* (2013.01); *F02D 41/0025* (2013.01); *F02D 41/0027* (2013.01); *F02G 5/00* (2013.01); *F02M 25/00* (2013.01); *H02K 7/1807* (2013.01); *H02K 7/1815* (2013.01); *B01D 2257/708* (2013.01); *F02D 19/0634* (2013.01); *Y02E 20/14* (2013.01); *Y02E 20/16* (2013.01); *Y02T 10/16* (2013.01); *Y02T 10/36* (2013.01)

(58) Field of Classification Search
USPC ....................................... 290/2; 60/777, 783
See application file for complete search history.

(56) References Cited

U.S. PATENT DOCUMENTS

| | | | |
|---|---|---|---|
| 4,550,563 A | 11/1985 | Marchand | ...................... 110/264 |
| 4,820,594 A | 4/1989 | Sugita et al. | ................... 429/17 |

(Continued)

OTHER PUBLICATIONS

"Software Tools for Industry: Improve Overall Plant Efficiency and Fuel Use," U.S. Department of Energy (DOE), Dec. 2008, 2 pp.

(Continued)

*Primary Examiner* — Pedro J Cuevas
(74) *Attorney, Agent, or Firm* — Dawn-Marie Bey; Bey & Cotropia PLLC

(57) ABSTRACT

A Volatile Organic Compound (VOC) mitigation system employs a combination of technologies coupling VOC laden exhaust with a reciprocating engine and generator system (Combined Heat & Power (CHP) System) with heat recovery to destroy the VOC emissions and generate electric power and useful thermal energy.

18 Claims, 3 Drawing Sheets

Related U.S. Application Data continuation of application No. 14/667,938, filed on Mar. 25, 2015, now Pat. No. 9,500,144.

(60) Provisional application No. 61/973,595, filed on Apr. 1, 2014.

(51) Int. Cl.
  *F02D 29/06* (2006.01)
  *F02D 41/00* (2006.01)
  *F02M 25/00* (2006.01)

(56) References Cited

U.S. PATENT DOCUMENTS

| | | | | |
|---|---|---|---|---|
| 4,864,811 | A | 9/1989 | Pfefferle | 60/39.06 |
| 5,108,717 | A | 4/1992 | Deller et al. | 422/171 |
| 5,592,811 | A * | 1/1997 | Dodge | F02C 3/20 422/182 |
| 5,673,553 | A * | 10/1997 | Maese | F02C 3/20 431/5 |
| 5,718,112 | A * | 2/1998 | Dodge | F02C 3/20 422/182 |
| 5,832,713 | A * | 11/1998 | Maese | F02C 3/20 60/783 |
| 5,914,091 | A | 6/1999 | Holst et al. | 422/173 |
| 6,655,137 | B1 | 12/2003 | Sardari | 60/517 |
| 6,895,760 | B2 | 5/2005 | Kesseli | 60/775 |
| RE38,784 | E * | 8/2005 | Maese | F02C 3/20 431/5 |
| RE38,815 | E * | 10/2005 | Maese | F02C 3/20 60/39.463 |
| 6,951,111 | B2 | 10/2005 | Chen | 60/775 |
| 7,157,271 | B2 | 1/2007 | Ryu et al. | 435/294.1 |
| RE39,596 | E * | 5/2007 | Dodge | F02C 3/20 422/182 |
| 7,498,009 | B2 | 3/2009 | Leach et al. | 423/235 |
| 7,576,319 | B2 | 8/2009 | Miller et al. | 250/282 |
| 8,096,132 | B2 | 1/2012 | Huang et al. | 60/748 |
| 8,227,120 | B2 | 7/2012 | Vincitore | 429/416 |
| 8,397,509 | B2 | 3/2013 | Hwang | 60/723 |
| 8,500,862 | B2 | 8/2013 | Moorhead et al. | 95/146 |
| 8,776,734 | B1 | 7/2014 | Roy et al. | 123/1 A |
| 9,297,301 | B1 | 3/2016 | Joy et al. | |
| 9,352,265 | B2 | 5/2016 | Ryan et al. | |
| 9,352,266 | B2 | 5/2016 | Ryan et al. | |
| 9,353,946 | B2 | 5/2016 | Hamrin et al. | |
| 9,359,947 | B2 | 6/2016 | Lampe et al. | |
| 9,359,948 | B2 | 6/2016 | Hamrin et al. | |
| 9,371,993 | B2 | 6/2016 | Armstrong | |
| 9,381,462 | B2 | 7/2016 | Thatcher et al. | |
| 9,500,144 | B1 | 11/2016 | Steen et al. | 290/2 |
| 2003/0022360 | A1 | 1/2003 | Ryu et al. | 435/266 |
| 2004/0011121 | A1 | 1/2004 | Ashe et al. | 73/118.1 |
| 2008/0116054 | A1 | 5/2008 | Leach et al. | 204/157.3 |
| 2008/0128609 | A1 | 6/2008 | Miller et al. | 250/282 |
| 2011/0132197 | A1 | 6/2011 | Nagase et al. | 96/111 |
| 2012/0263635 | A1 | 10/2012 | Cork et al. | 423/245.3 |
| 2016/0193567 | A1 | 7/2016 | Matelich | 423/220 |
| 2016/0245139 | A1 | 8/2016 | Repp | |
| 2016/0245506 | A1 | 8/2016 | Maslov | |

OTHER PUBLICATIONS

"Combined Heat and Power (CHP)—Division of Energy Fact Sheet," Missouri Department of Economic Development Division of Energy, Mar. 2014, 5 pp.

"Combined Heat & Power (CHP) Resource Guide for Hospital Applications," Midwest CHP Application Center, 2007.

"Biomass Combined Heat and Power Catalog of Technologies," U.S. Environmental Protection Agency Combined Heat and Power Partnership, Sep. 2007, 122 pp.

"Waste Heat to Power Systems," U.S. Environmental Protection Agency Combined Heat and Power Partnership, May 30, 2012, 9 pp.

"Combined Heat and Power: A Resource Guide for State Energy Officials," National Association of State Energy Officials, 2013, 18 pp.

* cited by examiner

SYSTEM AND METHOD FOR MANAGING A VOLATILE ORGANIC COMPOUND EMISSION STREAM

CROSS-REFERENCE TO RELATED APPLICATION

The present application is a continuation of U.S. application Ser. No. 15/352,674, entitled "System and Method For Managing a Volatile Organic Compound Emission Stream," filed Nov. 16, 2016, which is a continuation of U.S. application Ser. No. 14/667,938, entitled "System and Method For Managing a Volatile Organic Compound Emission Stream," filed Mar. 25, 2015, now U.S. Pat. No. 9,500,144, which claims priority to and the benefit of U.S. Provisional Patent Application No. 61/973,595, entitled "Volatile Organic Compound Combined Heat & Power Conceptual Architecture," filed Apr. 1, 2014, all of which are incorporated herein by reference in their entirety.

BACKGROUND OF THE EMBODIMENTS

Field of the Embodiments

The embodiments serve industries which use or emit Volatile Organic Compounds (VOC's) or other organic compounds utilized in manufacturing, plastics production, coatings, painting, solvents, etc. More particularly, the embodiments are directed to an improved system and process for eliminating environmental pollution, reducing energy costs and reducing Greene House Gas emissions.

Description of Existing Art

Many industries necessarily produce environmental pollution as a by-product of their production processes. VOCs, including, for example, ethanol, acetone, isopropyl alcohol, heptanone, or triethanolamine are particularly troublesome and environmental regulations are in place to force industries to reduce or abate their gaseous emissions of VOCs. Currently these VOC producing industries employ a variety of mitigation measures including thermal oxidation, dilution, chemical fixation, recovery, and direct emission. Several existing concepts are employed to combust VOC laden air streams including small combustion turbines, engines and flares.

By way of example, a current VOC abatement technology includes a VOC concentrator (absorber) coupled with a thermal oxidizer to burn the desorbent (regeneration) effluent gas. Essentially these apparatuses utilize natural gas simply to burn the VOC regenerative products. While this process works to abate the VOCs, it is also wasteful as the heat generated by the natural gas is simply passed to ambient through the clean air exhaust. Further, fuel is required to provide pumped in cooling air.

Various prior art systems have been developed in attempts to produce a more efficient VOC abatement system by combining the base VOC abatement burner system described above with other systems. For example, U.S. Pat. No. 8,227,120 to Vincitore describes a VOC abatement system combined with a fuel cell power plant.

Another example of a destructive VOC removal system and process is described in U.S. Patent Publication No. 2012/0263635 to Cork et al. which describes a system and process for combusting methane released from an underground coal mine as part of ventilated air (also called Ventilated Air Methane or VAM). The combustion system includes, inter alia, a pre-heating zone wherein a thermal media is used to increase the temperature of the VAM prior to introducing it into the combustion zone. The system describes using the heated methane-free exhaust from the combustion zone to in turn heat the thermal media in the pre-heating zone, thus purporting to increase system efficiency.

Other exemplary prior art systems, such as that described in U.S. Pat. No. 8,500,862 to Moorhead et al., describe non-destructive systems and processes for removing VOCs. In Moorhead et al., a system and process for removing VOCs (vapors) such as gasoline, kerosene, crude fuel, butane, octane, Hexane, Pentane, LPG, LNG and other volatile fuels as well as volatile chemical vapors such as alcohol, amines, ketones, benzenes, toluenes, xylene, and ethyl benzene from emptied fuel tanks and containers without the need to flare, burn or oxidize is described. Moorhead et al. utilize a particularization and capture process whereby the remnant VOCs are first particularized and then captured in a vapor capture medium, which may be in a liquid form. This liquid may then be reused for its fueling properties.

Existing systems used for the elimination of industrial VOC streams are energy intensive, costly to install and maintain, and do not generate power. Some require extensive permitting and monitoring of emissions. A standing challenge remains in numerous polluting industries to meet VOC reduction requirements while also improving the overall efficiency of VOC management systems including reduced energy cost and dependence on Utility power, and increased energy efficiency and reliability.

SUMMARY OF THE EMBODIMENTS

In a first embodiment described herein, a system for mitigating volatile organic compounds (VOC) emissions generated as a by-product of a production process while producing energy therefrom includes: an exhaust system for expelling an exhaust stream as part of a production process, wherein the exhaust stream includes VOCs; a combustion engine for receiving the expelled exhaust stream and reducing the VOCs therein through combustion thereof; a fuel source for providing fuel to the combustion engine to be combined therein with the expelled exhaust stream for combustion; and at least one generator coupled to the combustion engine for receiving a combusted product from the combustion engine and producing electric power therefrom.

In a second embodiment described herein, a combined heat and power (CHP) system for mitigating volatile organic compounds (VOC) emissions generated as a by-product of a production process while producing energy therefrom includes: an exhaust system for expelling an exhaust stream as part of a production process, wherein the exhaust stream includes VOCs; a VOC concentration detector located in a path of the expelled exhaust stream and prior to a combustion engine, wherein the combustion engine receives the expelled exhaust stream after it passes through the VOC concentration detector and reduces the VOCs therein through combustion thereof and outputs mechanical energy and heat energy; a fuel source for providing fuel to the combustion engine to be combined therein with the expelled exhaust stream for combustion into the mechanical energy and the heat energy, the fuel source being in communication with the VOC concentration detector; at least one generator coupled to the combustion engine for receiving the mechanical energy from the combustion engine and producing electric power therefrom; and wherein the VOC concentration detector provides a VOC concentration signal to the fuel source and the fuel source is capable of controlling one or more attributes of the fuel provided to the combustion engine responsive to the received VOC concentration signal.

In a third embodiment described herein, a process for mitigating volatile organic compounds (VOC) emissions generated as a by-product of a production process while producing energy therefrom includes: receiving at a combustion engine, an exhaust stream generated during a production process, wherein the exhaust stream includes VOCs, and further receiving at the combustion engine, fuel from a fuel source; combusting, by the combustion engine, the exhaust stream and the fuel, wherein the combustion of the exhaust stream reduces the VOCs therein and the combustion engine outputs mechanical energy and heat energy; receiving by at least one generator coupled to the combustion engine the mechanical energy therefrom and producing electric power; and receiving by a thermal load receiver coupled to the combustion engine the heat energy therefrom and utilizing as part of the production process.

BRIEF DESCRIPTION OF FIGURES

The Summary of the Embodiments, as well as the following Detailed Description, is best understood when read in conjunction with the following exemplary drawings.

DETAILED DESCRIPTION

In a preferred embodiment, a VOC mitigation system employs the combination of proven industrial reciprocating engine generation equipment, thermal energy recovery and direct combustion of VOC's with the inlet combustion air.

Figure 1A:
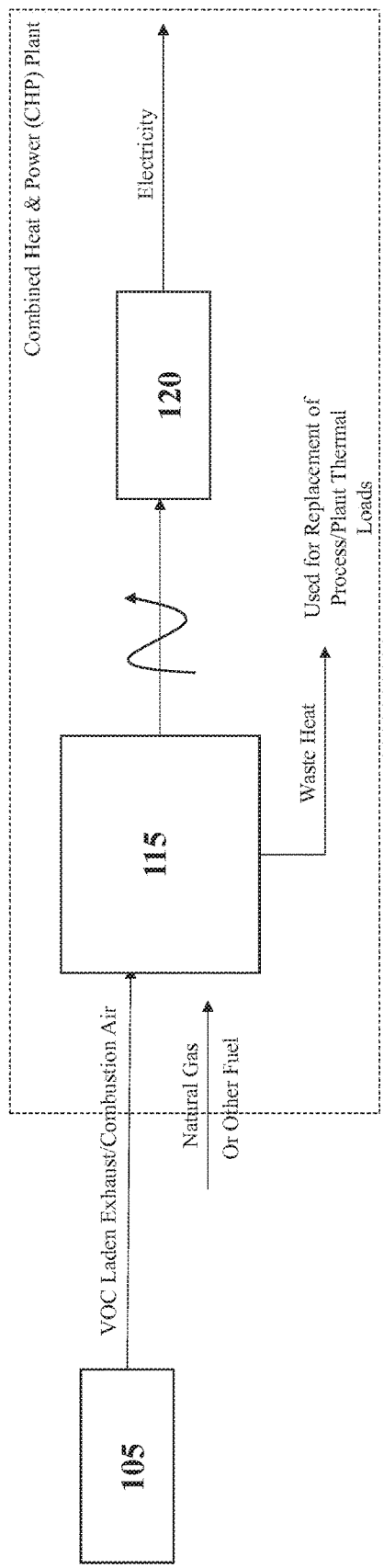
FIGS. 1a and 1b illustrate, schematically, embodiments of VOC mitigation systems in accordance with embodiments described herein with (FIG. 1b) and without (FIG. 1a) a VOC concentrator.
Figure 1B:
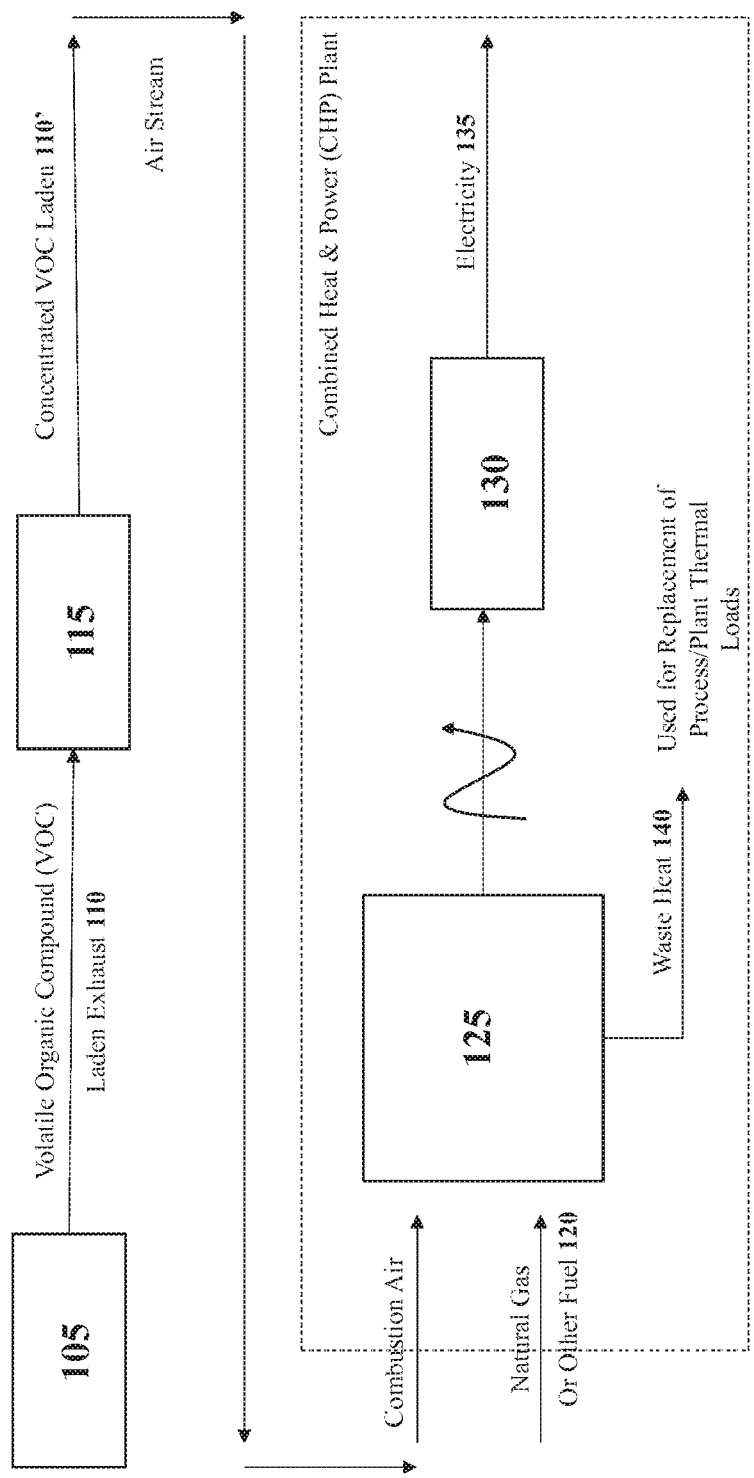

More particularly, referring to FIGS. 1a and 1b, a system 100 of the preferred embodiment includes an exhaust system 105, a VOC concentrator 115 (FIG. 1b), a reciprocating engine 125 and a generator 130. One skilled in the art recognizes that the combination of the elements of reciprocating engine 125 and a generator 130 is essentially a combined heat and power (CHP) system (plant). Accordingly, the preferred embodiment provides a systems approach to mitigating VOC emissions, reducing energy cost and increasing energy efficiency at large industrial facilities. The system 100 is a combination of technologies coupling VOC laden exhaust 110 (which may or may not be additionally concentrated 110') with reciprocating engine 125 and generators 130 with heat recovery to destroy the VOC emissions and generate electric power 135 and useful thermal energy 140.

As shown in FIG. 1a, the VOC stream 110 may be directly input to reciprocating engine 125 along with inlet base fuel 120, i.e., natural gas. Alternatively, as shown in FIG. 1b, the VOC stream 110 may be concentrated by VOC concentrator 115 prior to being introduced as concentrated VOC stream 110' into the inlet of reciprocating engine 125 for combustion. In both embodiments, the combustion process of the reciprocating engine 125 serves simultaneous dual functions of (1) acting as a thermal oxidizer to mitigate VOCs in the VOC stream 110 (or concentrated VOC stream 110') from the exhaust system 105 and (2) combusting combustion air for inputting to generator 130 for generation of electricity 135.

Figure 2:
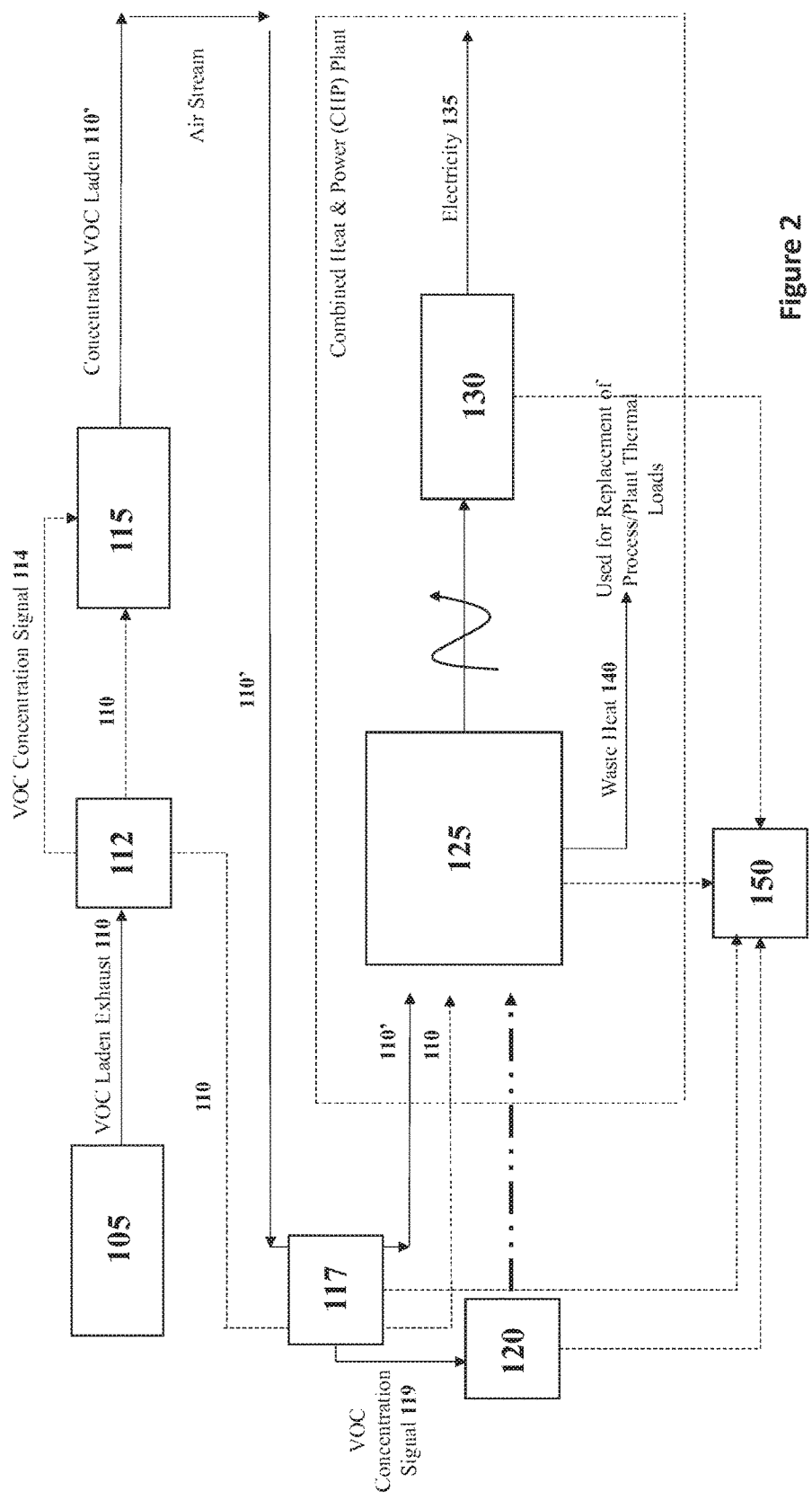
FIG. 2 illustrates, schematically, a VOC mitigation system in accordance with various embodiments described herein.

Concentration of the VOCs may be utilized to tune the overall system to optimize the relationship between generator output, VOC mass flow rate, and thermal output of the engine. Accordingly, an additional feature of the embodiments is modulation of the inlet base fuel (natural gas, propane, land fill gas, or other fuels) to compensate for variation in the VOC laden air stream concentration. In order to implement this additional modulation feature, as well as implementing the previously discussed feature related to the need for concentrating the VOC exhaust stream, sampling and measurement of VOC stream concentration at various stages in the process may be required. Referring to FIG. 2, optional sampling and measurement components 112, 117 are placed at various points along the path of the VOC stream 110, 110'. Components 112 and 117 may be any suitable device including, but not limited to Flame Ionization Detectors (FIDs) and Photo Ionization Detectors (PIDs). One skilled in the art recognizes the various types of suitable VOC concentrators and detection components that may be implemented as part of the embodiments described herein.

Component 112 may sample and measure VOC concentration in real-time or periodically to determine if the VOC concentration of VOC stream 110 should pass through directly to the inlet of combustion engine 125 or indirectly by way of concentrator 115. Component 112 may be programmable with a threshold value for VOC concentration and may also include a directional switching component for allowing the VOC stream to continue to the combustion engine 125 or pass to the concentrator 115. In an alternative configuration, the component 112 may simply sample and measure the concentration of VOCs in the VOC stream 110 and allow the VOC stream 110 to pass through to the concentrator 115, wherein the concentrator 115 is switchable between a concentrating state and non-concentrating state, i.e., pass-thru state. In this configuration, the component 112 could provide a signal 114 (e.g., Yes/No) to actuate (or not actuate) the switch of concentrator 115.

Component 117 may also sample and measure VOC concentration in real-time or periodically to determine the VOC concentration of VOC stream 110 (or 110' as the case may be) and provide the measurement to the base fuel source 120 through VOC concentration signal 119. Depending on the measurement provided, base fuel source 120 controls the amount of fuel, e.g., natural gas, propane, etc., which is input to combustion inlet 125. Ratios of VOC concentration and base fuel amounts are controlled to optimize outputs from the CHP, i.e., electrical power and waste heat. Accordingly, FIG. 2 also illustrates, schematically, steps and components for collecting individual I/O data for each of the inputs, e.g., VOC concentration and base fuel amount, and outputs, waste heat and electrical power, to/from the CHP components. This I/O data is processed, either manually or by a computer processor with appropriate software 150, to provide recommendations regarding adjustments to the controllable variables, i.e., VOC stream concentration and base fuel amount and/or type and/or flow rate. Utilizing all components illustrated in FIG. 2 in a single system in real-time (or as close as possible to real-time within the operational limits of the individual components), results in a continuous feedback system which optimizes efficiency of the system in accordance with the requirements/trade-offs indicated by a user. That is, as VOC mitigation requirements change (more stringent or less stringent) and/or as power requirements change (more/less), the controllable system variables may be changed by adjusting the components.

Though not described herein in detail, one skilled in the art recognizes the existing uses for the waste heat 140 generated by the combustion engine as part of the CHP system. For example, the waste heat from the power generator can be used for process heating and cooling through a waste heat recovery loop. Applications include space heating, absorption chillers, dehumidifiers, heat pumps, heat wheels, and other devices. The following documents provide descriptions and summarize exemplary CHP systems and tools and are incorporated herein by reference in their entirety: "Software Tools for Industry: Improve Overall Plant Efficiency and Fuel Use" (U.S. Department of Energy (DOE); December 2008); "Combined Heat and Power (CHP)-Division of Energy fact sheet" (Missouri Department of Economic Development Division of Energy; March 2014); "Combined Heat & Power (CHP) Resource Guide for Hospital Applications" (Midwest CHP Applicant Center; 2007); "Biomass Combined Heat and Power Catalog of Technologies" (U.S. Environmental Protection Agency Combined Heat and Power Partnership; September 2007); "Waste Heat to Power Systems" (U.S. Environmental Protection Agency Combined Heat and Power Partnership; May 30, 2012); and "Combined Heat and Power: A Resource Guide for State Energy Officials" (National Association of State Energy Officials; 2013).

In concluding the detailed description, it should be noted that it would be obvious to those skilled in the art that many variations and modifications can be made to the embodiments without substantially departing from the principles described herein. Also, such variations and modifications are intended to be included within the scope as set forth in the appended claims.

It should be emphasized that the above-described embodiments are merely possible examples of the implementations, set forth for a clear understanding of the principles thereof. Any variations, modifications and arrangements may be made to the above-described embodiments without departing substantially from the spirit of the principles of the embodiments. All such modifications, variations and arrangements are intended to be included herein within the scope of the disclosure.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of components may be resorted to without departing from the spirit and scope thereof.

We claim:

1. A system for mitigating volatile organic compounds (VOC) emissions generated as a by-product of a production process while producing energy therefrom, the system comprising:
    an exhaust system for expelling an exhaust stream as part of a production process;
    a detector located in a path of the expelled exhaust stream for determining a concentration of VOC in the expelled exhaust stream and passing the expelled exhaust stream directly to a combustion engine when a determined concentration of VOC's therein is above a predetermined threshold level; and
    a combustion engine for receiving the expelled exhaust stream containing VOC's and reducing the expelled exhaust stream containing VOC's to usable mechanical energy and heat energy components.

2. The system according to claim 1, further comprising at least one generator coupled to the combustion engine for receiving the useable mechanical energy components from the combustion engine and producing electric power therefrom.

3. The system of claim 1, further comprising a VOC concentrator, located in a path of the expelled exhaust stream after the detector and prior to the combustion engine, for producing a concentrated VOC expelled exhaust stream when the detector determines that the concentration of the VOC's therein is below a predetermined threshold level.

4. The system of claim 3, wherein the VOC concentrator produces a VOC concentration signal which is passed, along with the expelled exhaust stream, to the VOC concentrator.

5. The system of claim 1, wherein the detector is selected from the group consisting of a Flame Ionization Detector (FID) and a Photo Ionization Detectors (PID).

6. The system of claim 4, wherein the system further comprises a controllable fuel source for providing fuel to the combustion engine.

7. The system of claim 6, wherein the controllable fuel source receives the VOC concentration signal and adjusts an amount of fuel provided to the combustion engine responsive to the VOC concentration signal.

8. The system of claim 1, wherein the combustion engine provides useable heat energy components to one or more additional components of the system for use thereby.

9. A combined heat and power (CHP) system for mitigating volatile organic compounds (VOC) emissions generated as a by-product of a production process while producing useable energy therefrom, the system comprising:
    a first detector located in a path of an exhaust stream expelled during the production process for determining a first concentration of VOC in the expelled exhaust stream and generating a first VOC concentration signal indicative thereof;
    a VOC concentrator, located in a path of the expelled exhaust stream after the first detector; and
    a combustion engine for receiving the expelled exhaust stream from the VOC concentrator and reducing the expelled exhaust stream to usable mechanical energy and heat energy components;
    wherein the VOC concentrator is switchable between a pass-thru state and a concentration state responsive to a value of the received first VOC concentration signal.

10. The system according to claim 9, further comprising at least one generator coupled to the combustion engine for receiving the useable mechanical energy components from the combustion engine and producing electric power therefrom.

11. The system of claim 9, wherein the detector is selected from the group consisting of a Flame Ionization Detector (FID) and a Photo Ionization Detectors (PID).

12. The system of claim 9, wherein the system further comprises a controllable fuel source for providing fuel to the combustion engine.

13. The system of claim 6, wherein the controllable fuel source receives the first VOC concentration signal and adjusts an amount, type or flow rate of fuel provided to the combustion engine responsive to the first VOC concentration signal.

14. The system of claim 9, wherein the combustion engine provides useable heat energy components to one or more additional components of the system for use thereby.

15. The system of claim 9, further comprising:
- a second detector for receiving the expelled exhaust stream from the VOC concentrator for determining a second concentration of VOC in the expelled exhaust stream and generating a second VOC concentration signal indicative thereof; and
- a controllable fuel source for providing fuel to the combustion engine, wherein the controllable fuel source receives the first and second VOC concentration signals and adjusts an amount, type or flow rate of fuel provided to the combustion engine responsive thereto.

16. A process for mitigating volatile organic compounds (VOC) emissions generated as a by-product of a production process while producing energy therefrom, the process comprising:
- receiving an exhaust stream generated during the production process at a VOC concentration detector and generating a VOC concentration signal indicative of a concentration of VOCs detected therein;
- receiving the VOC concentration signal at a controllable fuel source;
- receiving at a combustion engine, the exhaust stream and fuel from the fuel source, wherein at least one of fuel amount, type and flow rate is adjusted by the controllable fuel source responsive to the VOC concentration signal prior to providing fuel to the combustion engine; and
- producing, by the combustion engine, mechanical energy and heat energy.

17. The process of claim 16, further comprising:
- receiving by at least one generator coupled to the combustion engine the mechanical energy therefrom and producing electric power; and
- receiving by a thermal load receiver coupled to the combustion engine the heat energy therefrom and utilizing as part of the production process.

18. The process according to claim 16, further comprising:
- receiving the exhaust stream and the VOC concentration signal at a VOC concentrator;
- switching the VOC concentrator between a first pass-thru state, whereby the exhaust stream is not subject to additional concentration before passing the exhaust stream to the combustion engine, and a second concentration state, whereby the exhaust stream is subject to additional concentration before passing the exhaust stream to the combustion engine, responsive to a value of the VOC concentration signal received thereby.

* * * * *